United States Patent
Tanaka

(10) Patent No.: US 10,728,535 B2
(45) Date of Patent: Jul. 28, 2020

(54) 3D IMAGE CONTENTS VIEWING SYSTEM

(71) Applicant: Masahide Tanaka, Osaka (JP)

(72) Inventor: Masahide Tanaka, Osaka (JP)

(73) Assignee: NL GIKEN INCORPORATED, Osaka (JP)

(*) Notice: Subject to any disclaimer, the term of this patent is extended or adjusted under 35 U.S.C. 154(b) by 0 days.

(21) Appl. No.: 16/257,251

(22) Filed: Jan. 25, 2019

(65) Prior Publication Data

US 2019/0158821 A1 May 23, 2019

Related U.S. Application Data

(63) Continuation of application No. 15/846,095, filed on Dec. 18, 2017, now Pat. No. 10,225,548, which is a continuation of application No. 14/251,570, filed on Apr. 12, 2014, now abandoned, which is a continuation of application No. 12/975,280, filed on Dec. 21, 2010, now abandoned.

(30) Foreign Application Priority Data

Dec. 23, 2009 (JP) ................................. 2009-291605

(51) Int. Cl.
*H04N 13/398* (2018.01)
*H04N 13/332* (2018.01)
*H04N 13/341* (2018.01)

(52) U.S. Cl.
CPC ......... *H04N 13/398* (2018.05); *H04N 13/332* (2018.05); *H04N 13/341* (2018.05); *H04N 2213/008* (2013.01)

(58) Field of Classification Search
None
See application file for complete search history.

(56) References Cited

U.S. PATENT DOCUMENTS

| | | | |
|---|---|---|---|
| 2005/0089212 A1* | 4/2005 | Mashitani | H04N 13/296 382/154 |
| 2005/0147309 A1* | 7/2005 | Katata | H03M 7/30 382/239 |
| 2008/0036854 A1* | 2/2008 | Elliott | H04N 19/597 348/55 |
| 2008/0303832 A1* | 12/2008 | Kim | G09G 3/003 345/501 |

(Continued)

*Primary Examiner* — Chikaodili E Anyikire

(57) ABSTRACT

3D television set or its external speaker box has container for a plurality of 3D spectacles. Container can locate individual 3D spectacles therein. Each of 3D spectacles has unique modulation reflector of infrared synchronizing signal. 3D television set displays 3D image on 3D program upon use of 3D spectacles detected directly by the modulation reflection or indirectly by 3D spectacles not remaining in container. 3D television set displays 2D image on 3D program if nonuse of 3D spectacles is detected directly by the no modulation reflection or indirectly by 3D spectacles remaining in container. Upon detection of nonuse, recommendation display is made to ware 3D spectacles. During 2D commercial message, synchronizing signal is halted. Recommendation to put unnecessary 3D spectacles in container is made upon end of every program, or end of 3D program followed by 2D program, or right before power off of 3D television set.

20 Claims, 7 Drawing Sheets

(56) References Cited

U.S. PATENT DOCUMENTS

| | | | |
|---|---|---|---|
| 2010/0085424 A1* | 4/2010 | Kane | H04N 13/359 348/53 |
| 2011/0025821 A1* | 2/2011 | Curtis | H04N 13/341 348/43 |
| 2011/0261155 A1* | 10/2011 | Tsuruga | H04N 21/431 348/43 |

* cited by examiner

3D IMAGE CONTENTS VIEWING SYSTEM

CROSS REFERENCE TO RELATED APPLICATION

This application is a Continuation application of U.S. application Ser. No. 15/846,095 filed Dec. 18, 2017, which is a Continuation application of U.S. application Ser. No. 14/251,570 filed Apr. 12, 2014, which is a Continuation application of U.S. application Ser. No. 12/975,280 filed Dec. 21, 2010, herein incorporated by reference in its entirety.

BACKGROUND OF THE INVENTION

1. Field of the Invention

This invention relates to 3D (three-dimensional) image contents viewing system such as 3D television set.

2. Description of the Related Art

In this field of the art, various attempts have been done with respect to 3D image viewing.

For example, Japanese Publication No. 2009-296118 proposes a broadcast receiving terminal device capable of receiving television broadcast data, in which 3D image is displayed if current position of the user is within an adequate area to view the 3D image. The terminal device starts to record the 3D image if current position of the user goes outside the adequate area afterward. Further, the terminal device converts the 3D image into 2D image for display if current position of the user goes outside the adequate area.

However, there still exist in this field of art many demands for improvements of 3D image contents viewing systems.

SUMMARY OF THE INVENTION

Preferred embodiment of this invention provides a 3D image contents viewing system in cooperation with 3D spectacles, in which coordination among the 3D image contents viewing system and the with 3D spectacles is improved.

Preferred embodiment of this invention provides a 3D image contents viewing system in cooperation with 3D spectacles, in which a risk of loss of 3D spectacles is reduced.

Preferred embodiment of this invention provides a 3D image contents viewing system in cooperation with 3D spectacles comprising an image contents providing unit capable of providing 3D image contents and 2D image contents, a display arranged to display image, an image output unit arranged to transmit 3D image to the display on the basis of the 3D image contents and to transmit 2D image to the display on the basis of the 3D image contents, a detector arranged to detect use or nonuse of the 3D spectacles, and a controller responsive to the detector arranged to have the image output unit transmit 3D image to the display on the basis of the 3D image contents if the detector detect use of the 3D spectacles, and to have the image output unit transmit 2D image to the display on the basis of the 3D image contents if the detector detect nonuse of the 3D spectacles.

According to the above feature, such an inconvenience is avoided that a user can no more enjoy 3D program on air if 3D spectacles is unfortunately lost, for example, in the 3D image contents viewing system in which 3D spectacles is integral to the system.

In a detailed design according to the above preferred embodiment, the detector includes a wireless receiver arranged to receive from the 3D spectacles information indicative of use or nonuse of 3D spectacles. Thus, the function of the controller to have the image output unit transmit 2D image on the basis of the 3D image contents is directly achieved.

According to a more detailed design of the above preferred embodiment, the 3D image contents viewing system further comprises a transmitter arranged to transmit synchronizing signal to 3D spectacles for 3D image viewing, wherein the receiver includes reflection receiver responsive to reflection of the synchronizing signal on 3D spectacles. Thus the wireless communication is advantageously achieved with the synchronizing signal for 3D spectacles utilized.

According to a further detailed design of the above preferred embodiment, the receiver is arranged to identify each of the 3D spectacles on the basis of the reflection of the synchronizing signal on individual 3D spectacles. By means of this feature, it is possible to prepare a plurality of 3D spectacles of different sizes or lens powers for personal use in a home or the like where 3D television set is shared.

According to another detailed design of the above preferred embodiment, the 3D image contents viewing system further comprises a container of the 3D spectacles, wherein the detector is arranged to detect use or non use of 3D spectacles on the basis of existence or nonexistence of the 3D spectacles within the container. Thus, the function of the controller to have the image output unit transmit 2D image on the basis of the 3D image contents is indirectly achieved.

In another detailed design according to the above preferred embodiment, the 3D image contents viewing system further comprises informing unit arranged to make recommendation to ware 3D spectacles in response to the detector. Thus, the recommendation is suitably made depending on necessity. In other word, it is possible to omit the bothersome recommendation if 3D spectacles has already been in use. The recommendation may be advantageously and typically made on the display.

Preferred embodiment of this invention provides another 3D image contents viewing system in cooperation with 3D spectacles comprising an image contents providing unit capable of providing 3D image contents and 2D image contents, the 2D image contents breaking in on 3D image contents. The 3D image contents viewing system further comprises a display arranged to display image, an image output unit arranged to transmit 3D image to the display on the basis of the 3D image contents and to transmit 2D image to the display on the basis of the 2D image contents, a transmitter arranged to transmit synchronizing signal to 3D spectacles for 3D image viewing, and a controller arranged to have the transmitter basically transmit the synchronizing signal throughout 3D image contents on which 2D image brakes in, and to have the transmitter halt the synchronizing signal transmission during 2D image is transmitted to the display. A typical example of the 3D image contents on which 2D image brakes in is a 3D program including 3D image contents constituting main body thereof and 2D commercial message breaking in on the 3D main body.

Due to the halt of synchronizing signal generation, 3D spectacles halts the synchronizing operation to keep a still state during CM or the like, which is advantageous for eyes to be refreshed.

According to a detailed design of the above preferred embodiment, the image output unit is arranged to superimpose information on the display indicative of the halt of the synchronizing signal transmission. Due to the superimposed information of in-2D display, the user may take 3D spectacles off according to its own will during CM or the like for positively refreshing its eyes.

Preferred embodiment of this invention provides still another 3D image contents viewing system in cooperation with 3D spectacles comprising an image contents providing unit capable of providing 3D image contents, a display arranged to display image, an image output unit arranged to transmit 3D image to the display on the basis of the 3D image contents, and a container arranged to keep nonuse 3D spectacles. According to this feature, coordination among the 3D image contents viewing system and 3D spectacles is improved in that a risk of loss of 3D spectacles is reduced by means a regularly used container.

According to a detailed design of the above preferred embodiment, the container is arranged to check existence or nonexistence of the 3D spectacles within the container. Thus, the risk of loss of 3D spectacles is advantageously reduced.

According to more detailed design of the above preferred embodiment, the container is arranged to identify each of the 3D spectacles within the container. By means of this feature, it is possible to prepare a plurality of 3D spectacles of different sizes or lens powers for personal use in a home or the like where 3D television set is shared.

According to another detailed design of the above preferred embodiment, the 3D image contents viewing system further comprises informing unit arranged to make recommendation to put unnecessary 3D spectacles in the container. Thus, the risk of loss of 3D spectacles is advantageously reduced.

For example, the informing unit is arranged to make recommendation every time when an image contents ends. Or, the informing unit is arranged to make recommendation in response to the end of the 3D image contents. In this case, the informing unit may be arranged to skip the recommendation if the next image contents is of 3D. According to still another example of detailed design, the informing unit is arranged to make recommendation prior to power off of the 3D image contents viewing system. The recommendation may be advantageously and typically made on the display.

Other features, elements, arrangements, steps, characteristics and advantages according to this invention will be readily understood from the detailed description of the preferred embodiment in conjunction with the accompanying drawings.

The above description should not be deemed to limit the scope of this invention, which should be properly determined on the basis of the attached claims.

DETAILED DESCRIPTION OF THE PREFERRED EMBODIMENTS

Figure 1:
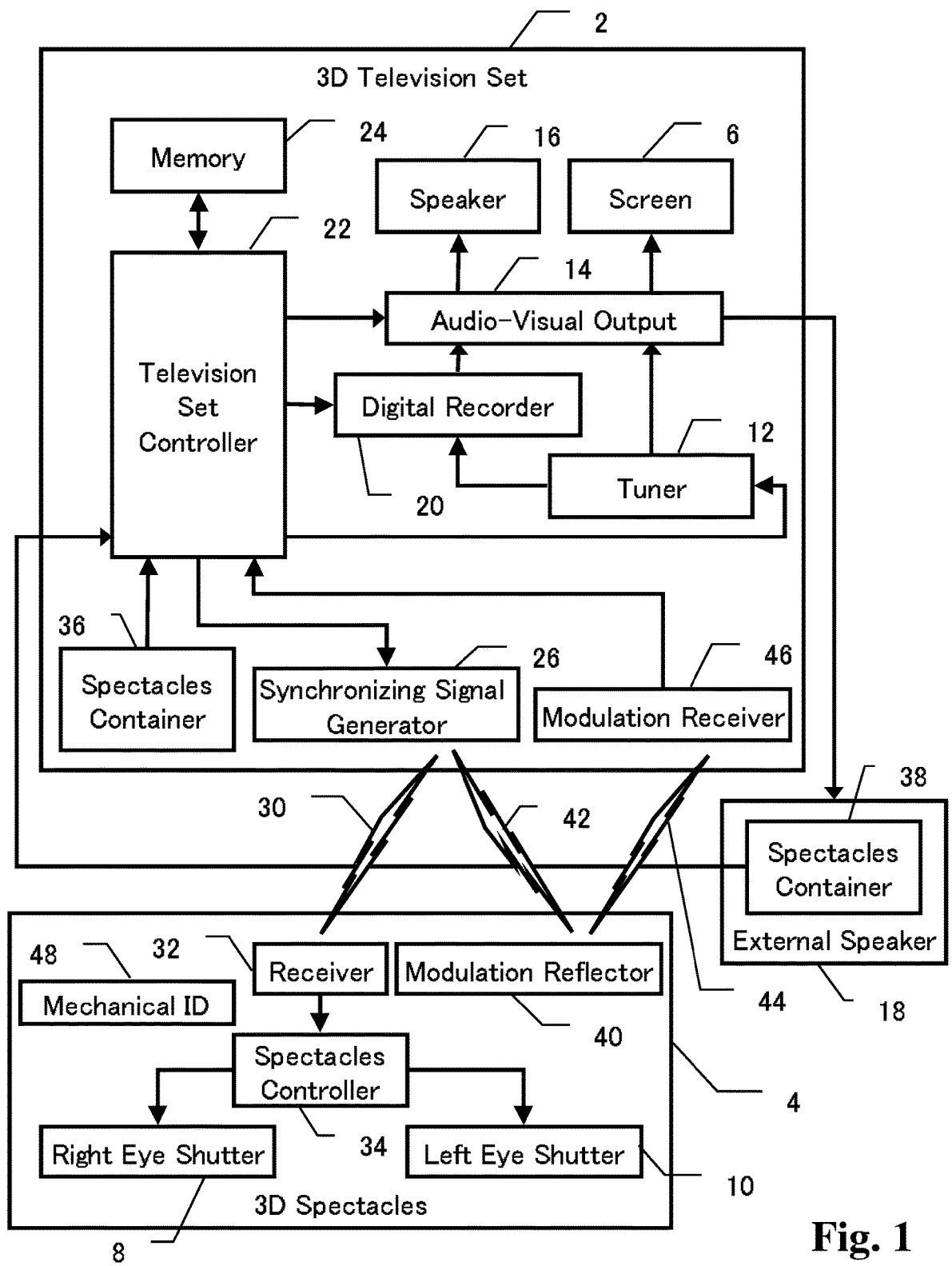
FIG. 1 is a block diagram showing a 3D digital moving image contents viewing system including digital 3D television set and 3D spectacles.

FIG. 1 is a block diagram showing a three-dimensional (hereinafter referred to as "3D") digital moving image contents viewing system including digital 3D television (hereinafter referred to as "TV") set 2 and 3D spectacles 4. 3D digital moving image contents include images for the right eye and the left eye which are alternately displayed on screen 6 according to a time-sharing system. The images for the right eye and the left eye of 3D digital moving image contents displayed on screen 6 are separately viewed by right and left eyes through 3D spectacles 4 with right eye shutter 8 and left eye shutter 10 synchronously and alternately made transmissible.

Tuner 12 of 3D TV set 2 receives digital broadcast program, which is a typical example of digital moving image contents, through an antenna or c cable to output from audio-visual (hereinafter referred to as "AV") output 14 the audio signal and visual signal of the program to speaker 16 and screen 6, respectively. AV output 14 further outputs audio signal to external speaker 18 for enhancing the acoustic field. Digital recorder 20 is designed to record the digital broadcast program received by tuner 12, and to reproduce the recorded program, which is in turn outputted from AV output 14 to speaker 16 and screen 6. AV output 14 is capable of converting 3D digital moving image contents from tuner 12 or digital recorder 20 into 2D (two-dimensional) digital moving image contents for display on screen 6 by means of restricting one of the image for the right eye and that for the left eye. If the images are restricted for right eye, for example, digital moving image contents are produced with the display timing for left eye interpolated by the image for right eye.

The above mentioned functions of tuner 12, AV output 14 and digital recorder 20 are controlled by TV set controller 22 including a microcomputer. Memory 24 stores program necessary for TV set controller 22 to carry out the functions as well as various temporal data necessary for the functions. Synchronizing signal generator 26 generates and transmits synchronizing infrared signal 30 for controlling right eye shutter 8 and left eye shutter 10 to alternately change between transmitting sate and shielding state in synchronism with the alternating of images for the right eye and the left eye on screen 6. Receiver 32 receives synchronizing infrared signal 30 to have spectacles controller 34 control the change in right eye shutter 8 and left eye shutter 10 between transmitting sate and shielding state. Right eye shutter 8 and left eye shutter 10 are both kept in the transmitting sate if receiver 32 does not receive synchronizing infrared signal 30.

3D TV set 2 is provided with spectacles container 36 for receiving 3D spectacles 4 is not in use. Spectacles container 36 is capable of containing a plurality of registered spectacled, in which each 3D spectacles 4 is identified to discriminate whether or not it is contained within spectacles container 36 by means of a mechanical contact between 3D spectacles 4 and a holder inside spectacles container 36, respectively, the information of presence or absence of each of spectacles 4 within spectacle container 36 being reported to TV set controller 22. External speaker 18 is also provided with similar spectacles container 38 in communication with TV set controller. Thus, TV set controller is always informed of presence or absence of each of spectacles 4 with the location, i.e. in spectacle container 36 in 3D television set or in spectacle container 38 in external speaker 18, identified. Further, TV set controller 22 can check whether or not each 3D spectacles 4 is gotten back into spectacle container 36 or spectacle container 38 after the end of a 3D digital moving image contents, which is advantageous to prevent loss of 3D spectacles 4.

Each of a plurality of 3D spectacles has modulation reflector 40 of unique optical characteristic which differs from the others. For example, modulation reflector 40 has a mark of unique pattern to reflect synchronizing infrared signal 42 generated by synchronizing signal generator 26. Modulation receiver 46 receives synchronizing infrared signal 44 reflected and modulated by modulation reflector 40 to extract the pattern information included in synchronizing infrared signal 44 for identifying each of 3D spectacles 4, respectively. In other words, it can be detected whether or not any and what 3D spectacles 4 is actually in use facing 3D TV set 2. Thus, 3D images are displayed on screen 6 on the basis of 3D digital moving image contents if it is detected that at least one 3D spectacles 4, which has been gotten out of spectacles container 36 or 38, is actually facing to 3D TV set. On the other hand, if modulation receiver 46 does not receive any modulated synchronizing infrared signal 44, even a 3D digital moving image contents is converted into 2D digital moving image contents for display on screen 6.

Each of a plurality of 3D spectacles also has mechanical identification 48 to discriminate whether or not the 3D spectacles is contained within spectacles container 36 or 38 by means of a mechanical contact between mechanical identification 48 and the holder inside spectacles container 36, respectively, the 3D spectacles being also identified if the presence thereof is discriminated. The same identification number or the like is commonly given to modulation reflector 40 and mechanical identification 48 as to the same 3D spectacles. By means of the above described identification of each 3D spectacles, it is possible to prepare a plurality of 3D spectacles of different sizes or lens powers for personal use in a home or the like where 3D television set 2 is shared.

Figure 2:
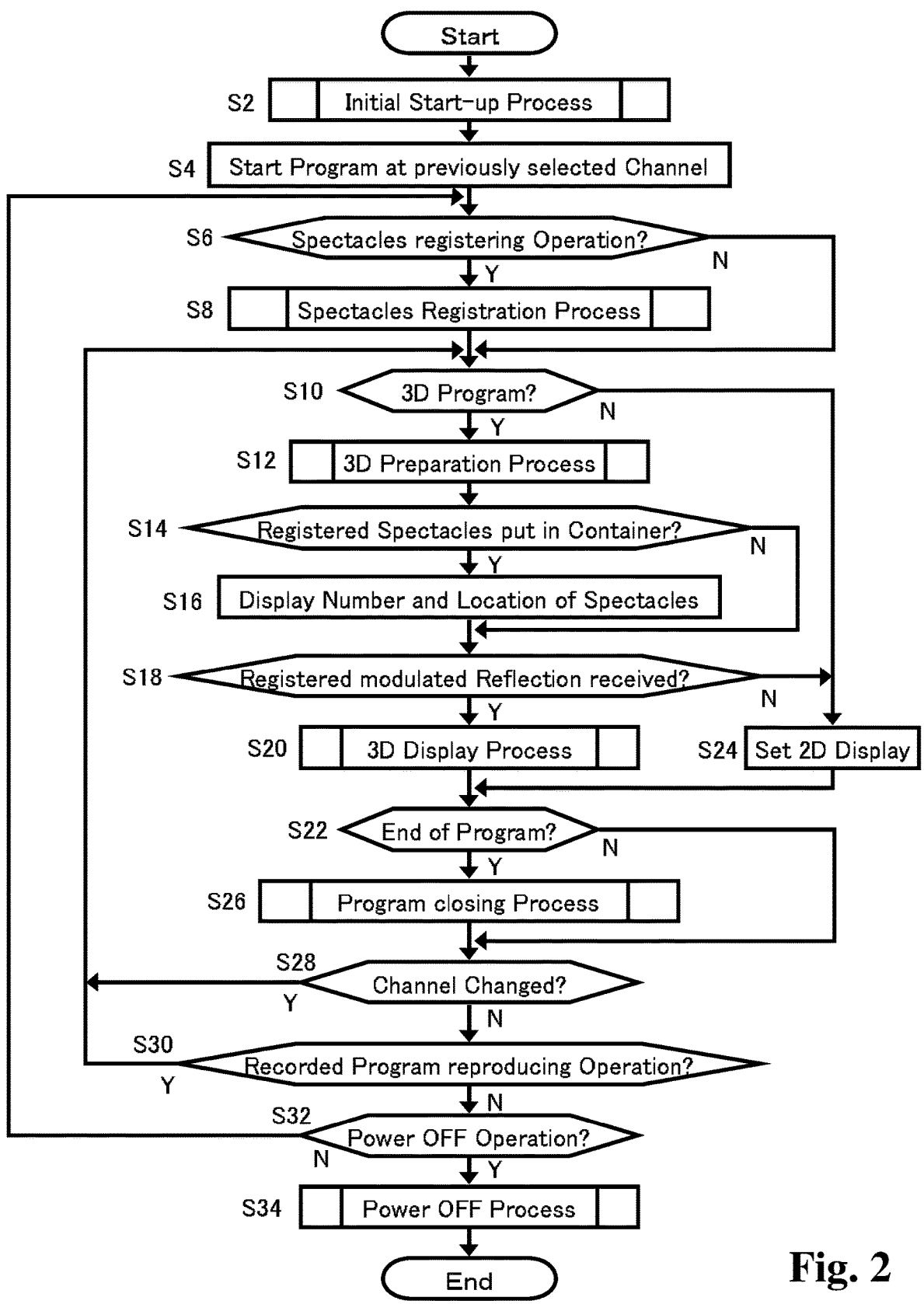
FIG. 2 is a basic flowchart showing the function carried out by TV set controller of the embodiment in FIG. 1.

FIG. 2 is a basic flowchart showing the function carried out by TV set controller 22 of the embodiment in FIG. 1. If the flow starts in response to the power ON operation of 3DTV set 2, step S2 comes first to carry out the initial start-up process of 3D TV set 2. In the initial start-up process in step S2, various functions in various portions of 3D TV set 2 are checked and the condition of 3D TV set including channel selection and sound volume setting upon the previous power OFF are restaged. Next in step S4, a program at the previously selected channel is started with the previous volume, the flow then going to step S6.

In step S6, it is checked whether or not an operation for registering a new 3D spectacles 4 is made. If a new 3D spectacles 4 registering operation is detected in step S6, the flow goes to step S8 for carrying out spectacles registration process to go to step S10. On the other hand, if no new 3D spectacles 4 registering operation is detected in step S6, the flow directly goes to step S10. The spectacles registration process in step S8 is for newly registering specific 3D spectacles 4 for identification thereof in administration of storage of 3D spectacles 4 in spectacles container 36 or 38 and detection of actual usage of 3D spectacles 4 by means of modulation receiver 46. The details of the spectacles registration process will be described later.

In step S10, it is checked whether or not 3D program is on air at the selected channel. In the case of 3D program, the flow goes to step S12 to carry out 3D preparation process, in which preparation of 3D spectacles 4 necessary for enjoying 3D program is confirmed, the process including initiation of synchronizing signal generation. The details of the 3D preparation process will be described later. Next in step S14, it is checked whether or not any of registered 3D spectacles 4 is put in container 36 or 38. If any, the flow goes to step S16 to display the number of the registered 3D spectacles contained within spectacles container 36 and 38, respectively, the flow then going to step S18. The display made in step S16 facilitates uses taking out 3D spectacles from spectacles container 36 or 38 when necessary including an increase of the number of members to enjoy 3D program. On the other hand, if it is not detected in step S14 that any registered 3D spectacles 4 is put in container 36 or 38, the flow directly goes to step S18.

In step S18, it is checked whether or not any modulated reflection form modulation reflector 40 of registered 3D spectacles is received by modulation receiver 46 in response to the generation of synchronizing signal initiated in step S12. If it is determined in step S18 that modulated reflection form registered 3D spectacles is received, the flow goes to step S20 to carry out 3D display process, the flow then going to step S22. On the other hand, if it is not determined in step S18 that any modulated reflection form registered 3D spectacles is received, the flow goes to step S24 to set 2D display in spite of 3D program on air, the flow then going to step S22. By the way, if it is determined in step S10 that 3D program is not on air at the selected channel, the flow also goes to step S24 to set 2D display, the flow then going to step S22. The 3D display process in step S20 relates to realization of 3D display including 3D display setting, the details of which will be described later.

In step S22, it is checked whether or not the program ended. If the end of program is detected in step S22, the flow goes to step S26 to carry our program closing process, the flow then going to step S28. On the other hand, if the end of program is not detected in step S22, the flow directly goes to step S28. The program closing process in step S26 includes recommendation to put 3D spectacles 4 in spectacles container 36 or 38 for avoiding loss thereof, the details of which will be described later.

In step S28, it is checked whether or not channel selection is changed. If not, the flow goes to step S30 to check whether or not any operation is done for reproducing recorded program. On the other hand, if it is determined in step S28 that channel selection is changed, the flow goes back to step S10 to repeat the loop of steps S10 to S28 in response to every channel change detected in step S28 for coping with the transition between the 3D and 2D programs on air and the change between use and nonuse of 3D spectacles. In step S30, it is checked whether or not any operation is made for reproducing a recorded program. In the case of the recorded program reproducing operation detected in step S30, the flow goes back to step S10 to also repeat the loop of steps S10 to S28 in response to every reproducing operation detected in step S30 for coping with the transition between the reproduced 3D and 2D programs and the change between use and nonuse of 3D spectacles.

On the other hand, if no operation for reproducing recorded program is detected in step S30, the flow goes to step S32 to check whether or not power OFF operation of 3DTV set 2 is made. If not, the flow goes back to step S6 to repeat the loop of steps S6 to S32 unless power OFF operation is detected. During the repetition of the loop of steps S6 to S32, the display of programs continues to cope with registration of new 3D spectacles 4, the channel change for selecting programs on air and the recorded program reproducing operation as well as the taking-out of 3D spectacles 4 from spectacles container 36 or 38 and the start of use thereof. Further, it should be noted that the transition between 3D display and 2D display on 3D program is automatically carried out in response to use or nonuse of 3D spectacles which is detected through the receipt of modulated reflection from registered 3D spectacles 4 checked every time when the flow comes to step S18 during the repetition of the loop of steps S6 to S32. According to the function above, the user can remove 3D spectacles 4 any time when he or she feels tired. And, he or she can returns to the condition of enjoying 3D display any time by means of simply putting 3D spectacles 4 on. However, it should also be noted that the flow goes from step S18 to step S20 if any one of the members who are commonly watching 3D TV set 2 wares 3D spectacles. Therefore, universal agreement by all members watching 3D TV set 2 to take 3D spectacles off is necessary for the flow to go from step S18 to step S24.

On the other hand, if it is determined in step S32 that power OFF operation of 3DTV set 2 is made, the flow goes to step S34 to carry out power OFF process. The power OFF process in step S34 includes recommendation to put 3D spectacles 4 in spectacles container 36 or 38 for avoiding loss thereof, the details of which will be described later.

Figure 3:
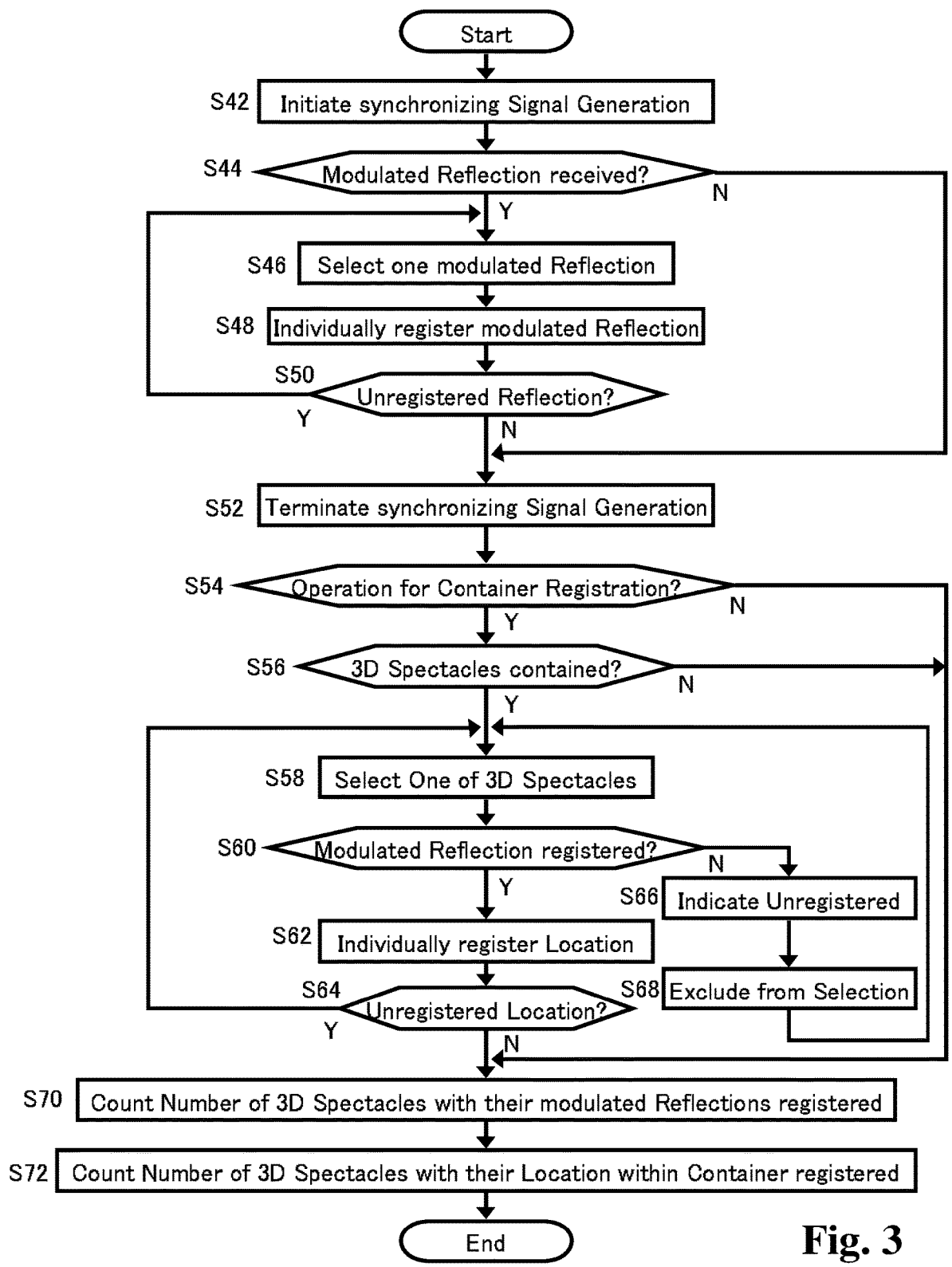
FIG. 3 is a flowchart showing the detailed function of the spectacles registration process in step S8 in FIG. 2.

FIG. 3 is a flowchart showing the detailed function of the spectacles registration process in step S8 in FIG. 2. If the flow starts, the generation of synchronizing signal from synchronizing signal generator 26 in FIG. 1 is initiated in step S42 for the purpose of registering 3D spectacles 4. Next in step S44, it is checked whether or not modulated reflection on modulation reflector 40 of 3D spectacles 4 is received by modulation receiver 46. In this case, all of new 3D spectacles 4 are to be prepared in front of 3D TV set 2 prior to spectacles registration operation. And, modulated reflection from each of 3D spectacles 4 can be received.

If modulated reflection is detected in step S44, the flow goes to step S46 to select one modulated reflection which is unique to each 3D spectacles 4. The selected modulated reflection is individually registered in the next step S48, the flow then going to step S50. In step S50, it is checked whether or not any modulation reflection left unregistered. If any, the flow goes back to step S46 to select next modulated reflection. Thus, the loop of steps S46 to S50 is repeated till no modulated reflection is left unregistered to thereby register all the modulated reflections each unique to each of new 3D spectacles 4 prepared in front of 3D TV set 2.

If it is determined in step S50 that no modulation reflection left unregistered, the flow goes to step S52 to terminate the generation of synchronizing signal for registration. By the way, if it is not determined in step S44 that modulated reflection is received by modulation receiver 46, the flow directly goes to step S52. This case normally occurs when spectacles registering operation is made for the purpose of container registration explained in the following description.

In step S54, it is checked whether or not the spectacles registering operation causing the flow of FIG. 3 is an operation made for the purpose of container registration. If it is determined in step S54 that the operation is for container registration, the flow goes to step S56 to check whether or not any 3D spectacles is contained in spectacles container 36 or 38. If any, the flow advances to step S58 to select one of 3D spectacles 4 contained, the flow then going to step S60. In step S60, it is checked whether or not the modulated reflection form selected 3D spectacles 4 has been registered. As has been mentioned above, the same identification number is commonly given to modulation reflector 40 and mechanical identification 48 of the same 3D spectacles, which makes it possible to check whether or not the modulated reflection of 3D spectacles 4 has been registered by means of detecting the common identification number through detection of mechanical identification 48 within spectacles container 36 or 38.

If it is determined in step S60 that the modulated reflection form selected 3D spectacles 4 has been registered, the flow goes to step S62 to individually register the location of 3D spectacles within spectacles container 36 or 38, the flow then going to step S64. In step S64, it is checked whether or not any 3D spectacles 4 is left with its location within spectacles container 36 or 38 unregistered. If any, the flow goes back to step S58 to select next one of 3D spectacles 4. On the other hand, if it is not determined in step S60 that the modulated reflection of selected 3D spectacles 4 has been registered, the flow goes to step S66 to indicate that the modulated reflection of selected 3D spectacles 4 has not been registered, and remove the selected 3D spectacles 4 from further selection, the flow then going back to step S58. Thus, 3D spectacles with its modulation reflection unregistered is neither registered as to its location within spectacles container 36 or 38.

According to the manner above, the loop of steps S58 to S68 is repeated till no 3D spectacles 4 is left with its location within spectacles container 36 or 38 unregistered. Thus, all 3D spectacles in spectacles container 36 and 38 with its modulation reflection registered are each registered as to its location in spectacles container 36 or 38. By means of such registration, the location of each 3D spectacles within spectacles container 36 or 38 is clear, which facilitates users easily taking out their own personal 3D spectacles 4 from spectacles container 36 or 38, respectively. On the other hand, if it is determined in step S64 that all 3D spectacles 4 with their modulation reflections registered are also registered as to their location within spectacles container 36 or 38, the flow goes to step S70. By the way, if it is not determined in step S54 that spectacles registering operation causing the flow of FIG. 3 is an operation made for the purpose of container registration, the flow directly goes to step S70. Further, if it is not determined in step S56 that any 3D spectacles is contained in spectacles container 36 or 38, the flow also goes to step S70 directly.

In step S70, the number of 3D spectacles with their modulated reflections registered is counted, the new ones registered in step S48 being included in the count. Further in step S72, the number of 3D spectacles with their location within spectacles container 36 or 38 registered is counted, the new ones registered in step S62 being included in the count. The flow then goes to the end. It should be noted that the number counted in step S72 cannot be greater than the number counted in step S70 since 3D spectacles with its modulation reflection unregistered is neither registered as to its location within spectacles container 36 or 38 by means of the function of steps S60, S66 and S68.

Figure 4:
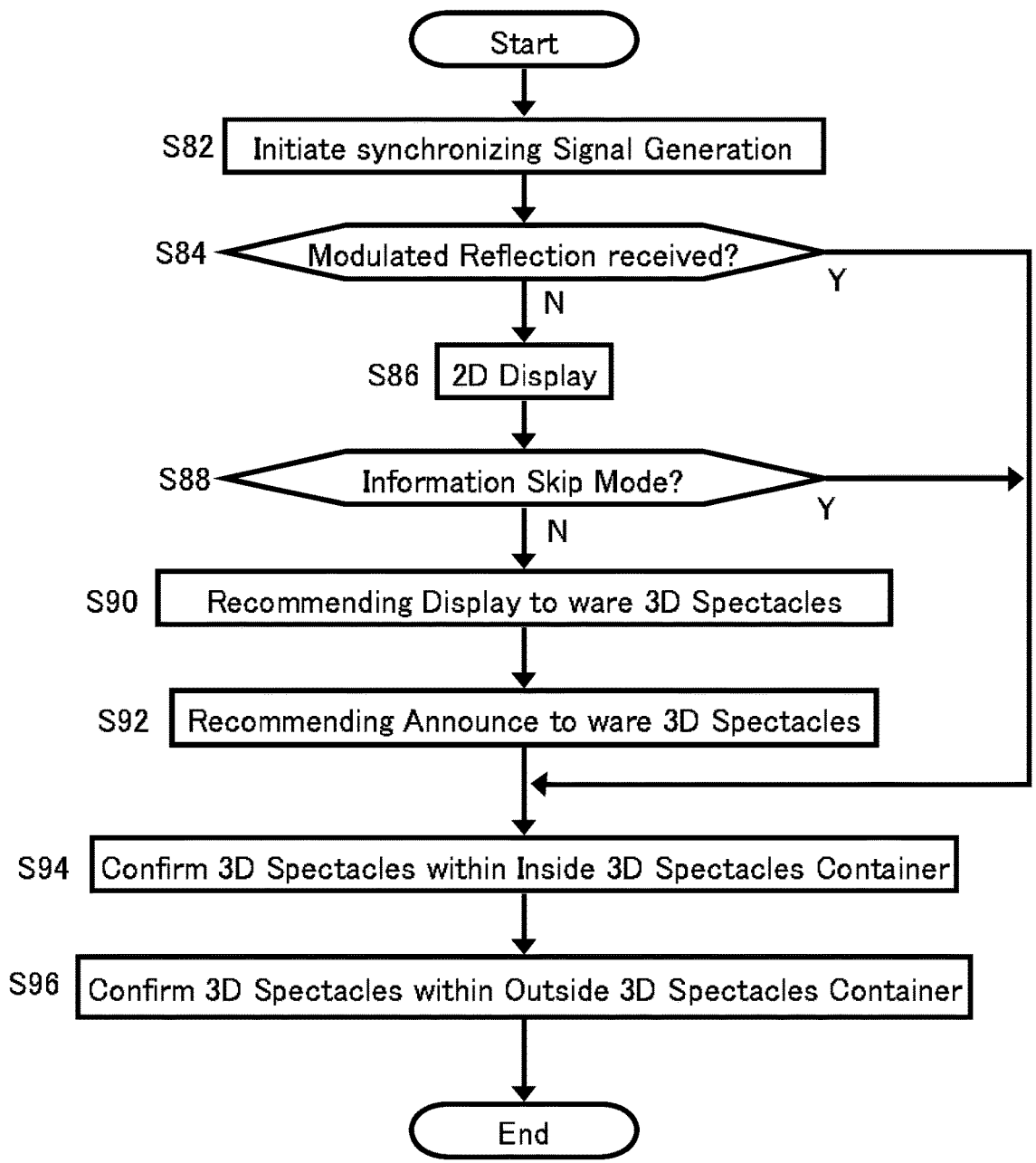
FIG. 4 is a flowchart showing the detailed function of the 3D preparation process in step S12 in FIG. 2.

FIG. 4 is a flowchart showing the detailed function of the 3D preparation process in step S12 in FIG. 2. If the flow starts, the generation of synchronizing signal from synchronizing signal generator 26 in FIG. 1 is initiated in step S82 for the purpose of enjoying 3D program. Next in step S84, it is checked whether or not modulated reflection on modulation reflector 40 of registered 3D spectacles 4 is received by modulation receiver 46. If not, the flow goes to step S86 to step S24 to set 2D display in spite of 3D program on air, the flow then going to step S88. In step S88, it is checked whether or not information skip mode, which is to be specially and optionally set, is set. If it is determined in step S88 that no skip mode is set to thereby keep normal mode in which recommendation is to be made, the flow goes to step S90 to make recommendation display on screen 6 to ware 3D spectacles 4. Further, recommendation announce from speaker 16 to ware 3D spectacles 4 is made in step S92, the flow then going to step S94. On the other hand, if it is determined in step S88 that information skip mode is set, the flow directly goes to step S94.

Further, if it is determined in step S84 that modulated reflection on modulation reflector 40 of registered 3D spectacles 4 is received by modulation receiver 46, the flow directly goes to step S94. This case corresponds to a condition that the flow has come into the repetition of steps 6 to 32 in FIG. 2 to continue enjoying 3D program in 3D display. In step S90 in FIG. 4, 3D spectacles 4 actually exist within spectacles container 36 inside 3D TV set 2 are determined. Similarly, in succeeding step S96, 3D spectacles 4 actually exist within spectacles container 38 in external speaker 18, which is outside 3D TV set 2, are determined. The flow of FIG. 4 goes to the end.

Figure 5:
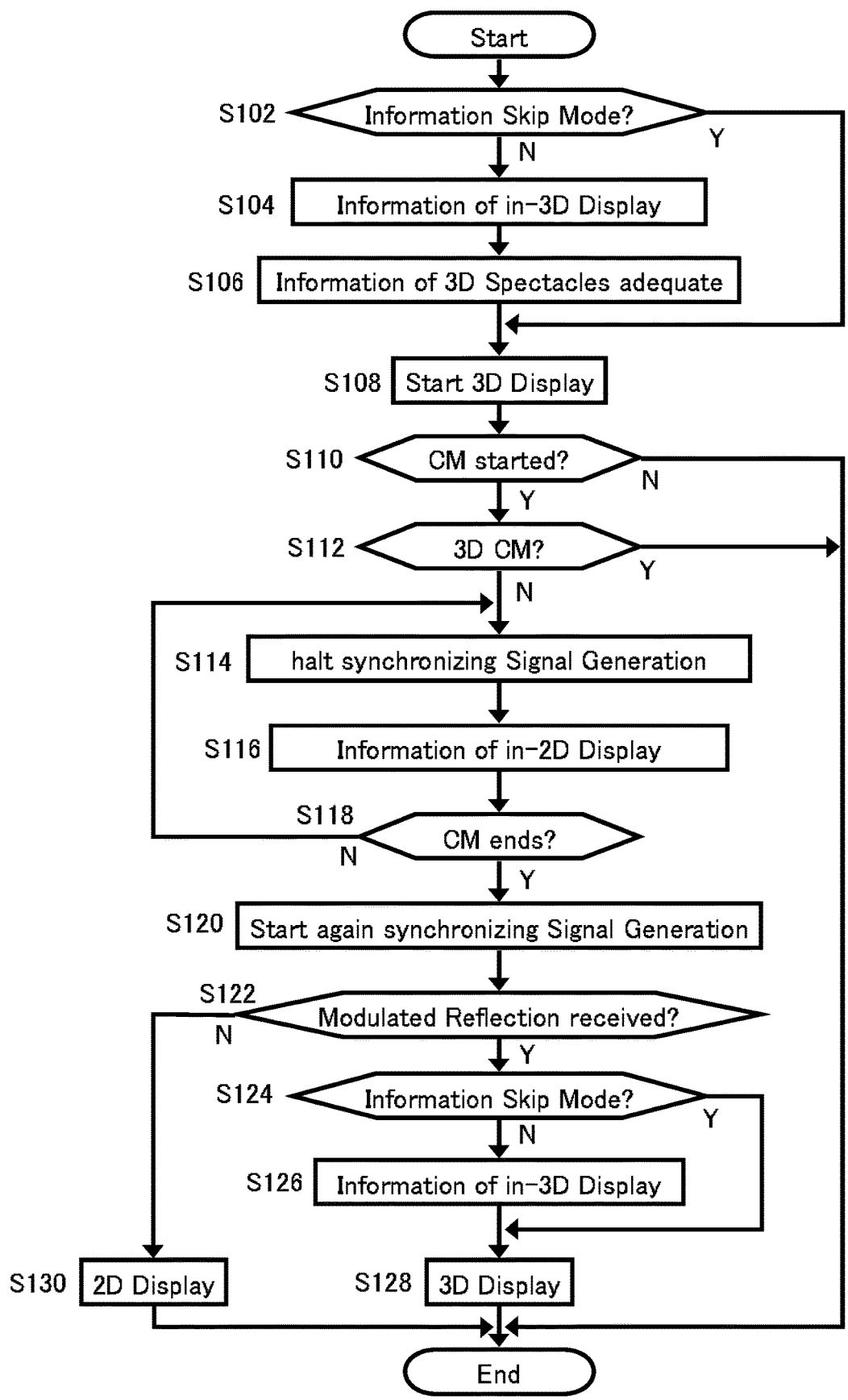
FIG. 5 is a flowchart showing the detailed function of the 3D display process in step S20 in FIG. 2.

FIG. 5 is a flowchart showing the detailed function of the 3D display process in step S20 in FIG. 2. If the flow starts, it is checked whether or not information skip mode is set. If not, the flow goes to step S104 to inform on screen 6 that 3D display is now being carried out. Further, in succeeding step S106, it is informed on screen 6 that all 3D spectacles 4 now in use are registered and adequate for the currently enjoyed 3D digital moving image contents viewing system, the flow then going to step 108. On the other hand, if it is determined in step S102 that information skip mode is set, the flow directly goes to step S108 to start 3D display of the 3D program.

Next in step S110 it is checked whether or not display of a commercial message (hereinafter referred to as "CM") is started. If the CM start is detected, the flow goes to step S112 to check whether or not the CM is produced in 3D system. If not, the flow goes to step S114 to halt the generation of synchronizing signal and further to step S116 to inform on screen 6 that 2D display is now being carried out, the flow then going to step S118. In step S118, it is checked whether or not the CM ends. If not, the flow goes back to step S114 to repeat the loop of steps S114 to keep the halt of synchronizing signal generation and the information display there of as long as CM continues. Due to the halt of synchronizing signal generation, right eye shutter 8 and left eye shutter 10 halt the alternate change between transmitting and shielding states to both keep the transmitting sate during CM, which is advantageous for eyes to be refreshed. Further, due to the information of in-2D display, the user can take 3D spectacles 4 off according to its own will during CM for positively refreshing its eyes.

On the other hand, if the end of CM is determined in step S118, the flow goes to step S120 to start again synchronizing signal generation. And, it is checked in the succeeding step S122 whether or not modulated reflection on modulation reflector 40 of registered 3D spectacles 4 is received. If the modulated reflection is detected, the flow goes from step S122 to step S124 to check whether or not information skip mode is set. If not, the flow goes to step S126 to inform on screen 6 that 3D display is now being carried out with 3D display comes back in step S128, the flow then going to the end. On the other hand, if it is determined in step S124 that information skip mode is set, the flow directly goes to step S128.

On the other hand if the receipt of modulated reflection on modulation reflector 40 of registered 3D spectacles 4 is not detected in step S122, the flow goes to step S130 to continue 2D display in spite of the 3D program comes back. Such a case may be caused when the user forgets to ware again 3D spectacles 4 which has been taken off during CM. Or, the case may be caused when the user continues to take 3D spectacles 4 off according to its own will after the end of CM. Even in the case of 2D display continued through step S130, step S108 will come to start 3D display in accordance with the repetition of the flow in FIG. 2 if 3D spectacles 4 will be put on any time to cause the detection of modulated reflection in step S18. On the other hand, if it the start of CM is not detected in step S110, the flow directly goes to the end. Further if it is determined in step S112 that the CM is produced in 3D system, the flow also goes to the end directly. In those cases, the 3D display is continued trough the 3D program or 3D CM.

Figure 6:
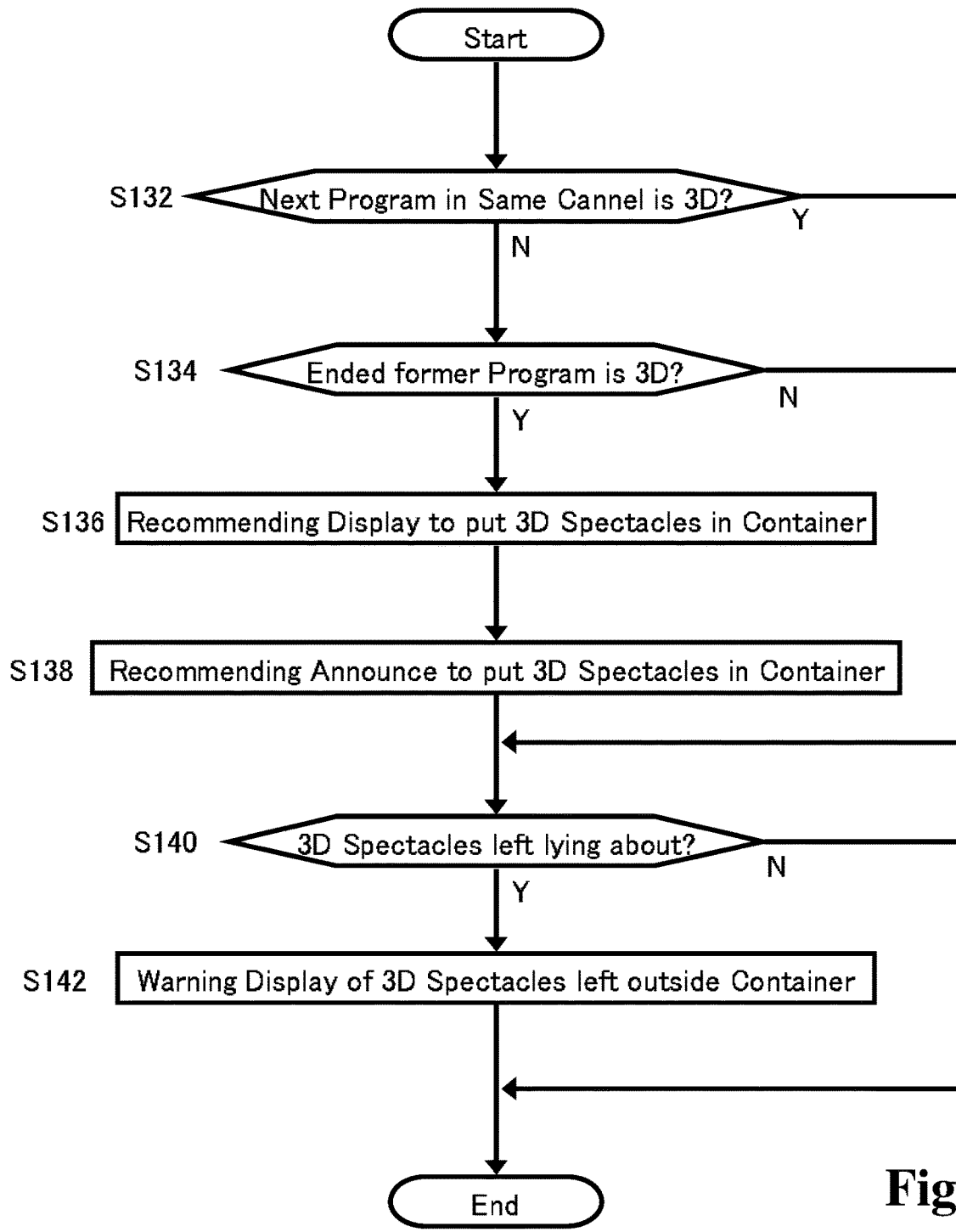
FIG. 6 is a flowchart showing the detailed function of the program closing process in step S26 in FIG. 2.

FIG. 6 is a flowchart showing the detailed function of the program closing process in step S26 in FIG. 2. If the flow starts, it is checked in step S132 whether or not the next broadcast program in the same channel is of 3D. If not, the flow goes to step S134 to check whether or not the ended former program detected step S22 in FIG. 2 is of 3D. In the case 3D program ended, the flow goes from step S134 to step S136 to make recommendation display on screen 6 to put 3D spectacles 4 in spectacles container 36 or 38. Further, recommendation announce from speaker 16 to put 3D spectacles 4 in spectacles container 36 or 38 is made in step S138, the flow then going to step S140. The flow from step S132 to step S136 by way of step S134 corresponds to a case that 3D program necessitating 3D spectacles 4 is followed by 2D program in which unnecessary 3D spectacles 4 is apt to be left lying about. Steps S136 and S138 are for avoiding loss of 3D spectacles 4 left as it is after using it. On the other hand, if it is determined in step S132 that the next broadcast program in the same channel is of 3D, the flow directly goes to step S140 since 3D spectacles 4 is still necessary. Further, if it is not determined in step S134 that the ended former program is of 3D, the flow directly goes to step S140 since it is not the case of 3D spectacles 4 formerly in use.

In step S140, it is checked whether or not any 3D spectacles 4 is left lying about in accordance with the information from spectacles container 36 or 38. If any, the flow goes to step S142 to make warning display of 3D spectacles 4 left outside spectacles container 36 or 38, the flow then going to the end. On the other hand, if no 3D spectacles 4 is detected to be left lying about in step S140, the flow directly goes to the end. The function of steps S140 and S142 is to be carried out regardless of whether the ended former program is of 3D or 2D. In other words, 3D spectacles 4 which is left lying about, if any, is warned in step S142 every time when one broadcast program is over to reduce the risk of loss of 3D spectacles 4.

Figure 7:
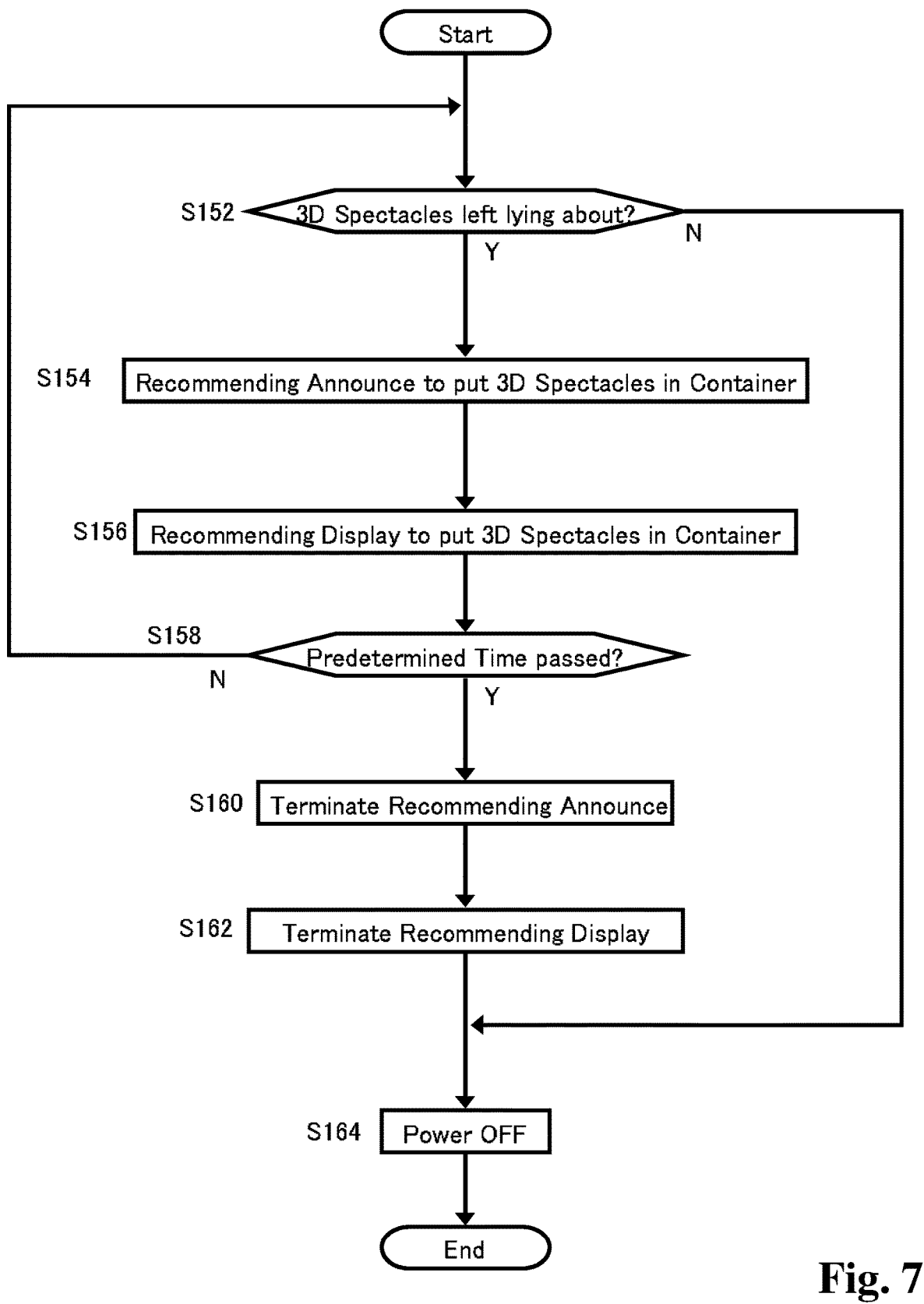
FIG. 7 is a flowchart showing the detailed function of the power OFF process in step S34 in FIG. 2.

FIG. 7 is a flowchart showing the detailed function of the power OFF process in step S34 in FIG. 2. If the flow starts, it is checked in step S152 whether or not any 3D spectacles 4 is left lying about in accordance with the information from spectacles container 36 or 38. If any, the flow goes to step S154 to make recommendation announce from speaker 16 to put 3D spectacles 4 in spectacles container 36 or 38. Further, recommendation display on screen 6 is made in step S156 to put 3D spectacles 4 in spectacles container 36 or 38, the flow then going to step S158.

In step S158, it is checked whether or not a predetermined time has passed counted from the detection of power OFF operation in step S32. If not, the flow goes back to step S152 to repeat the loop of steps S152 to S158 to continue the recommending announce and display to put 3D spectacles 4 in spectacles container 36 or 38 until it is detected in step S158 that the predetermined time has passed. On the other hand, if the predetermined time has passed, the flow goes from step S158 to step S160 to terminate the recommending announce to put 3D spectacles 4 in spectacles container 36 or 38. Further in the succeeding step S162 to terminate the recommending display to put 3D spectacles 4 in spectacles container 36 or 38, the flow then going to step S164. On the other hand, if it is determined in step S152 that no 3D spectacles 4 is left lying about, the flow directly goes to step S164. In step S164, the power OFF is carried out, the flow then going to the end.

3D spectacles 4 is so integral to the 3D digital moving image contents viewing system that the user can no more enjoy the 3D program on air if 3D spectacles 4 is unfortunately lost. The various features of the embodiment explained above are advantageous for reducing the risk of the loss of 3D spectacles 4 from various stand points, which provide useful 3D digital moving image contents viewing system with 3D TV set 2 and 3D spectacles 4 firmly unified.

The various features and advantages according to this invention are not limited to the disclosed embodiment above, but they are widely applicable to various other embodiments which are possible to enjoy one or more of the advantages of this invention. For example, such a modification is possible that modulation reflector 40 is omitted to simplify the structure of 3D spectacles 4, in which 3D TV set by itself is incapable of getting information of 3D spectacles in use by wireless means. In such a modification, nonuse of 3D spectacles 4 is indirectly concluded by the existence thereof within spectacles container 36 or 38, which can be easily detected by a simple mechanical engagement between 3D spectacles 4 and an inside structure of spectacles container 36 or 38. In this case, step S18 in FIG. 2, step S84 in FIG. 4 and step S122 in FIG. 6 each relating to the check, "Registered modulated Reflection received? are each replaced by a check, "All registered 3D spectacles exist within container?" According to the substitution in the above steps, 2D display is to be forced in spite of 3D program on air or reproduced since anyone never wares 3D spectacles if all registered 3D spectacles 4 exist within spectacles container 36 or 38.

What is claimed is:

1. A moving image contents viewing system capable of viewing a first type of moving image contents and a second type of moving image contents, comprising:
    a moving image contents provider configured to provide the first type of moving image contents and the second type of moving image contents;
    a display configured to display the first type of moving image contents and the second type of moving image contents from the image content provider;
    a generator of a synchronizing signal related to the display of the first type of the moving image contents; and
    a controller configured to have the generator transmit the synchronizing signal when the first type of moving image contents is displayed on the display and to have the generator halt the transmission of the synchronizing signal when the second type of moving image contents is displayed on the display,
    wherein the moving image contents provider is configured to provide the first type of the moving image contents followed by the second type of moving image contents, and wherein the controller is configured to halt the transmission of the synchronizing signal in response to the change in display from the first type of the moving image contents to the second type of moving image content,
    wherein the moving image contents provider is further configured to provide the second type of the moving image contents followed by the first type of moving image contents, and wherein the controller is configured to start again the transmission of the synchronizing signal in response to the change in display from the second type of the moving image contents to the first type of moving image contents, and
    wherein the moving image contents provider is configured to provide the first type of the moving image contents with the second type of moving image contents interposed at a midway of the first type of moving image contents.

2. The moving image contents viewing system according to claim 1, wherein the moving image contents provider is configured to convert the first type of moving image contents into the second type of moving image contents for display, and wherein the controller is configured to halt the transmission of the synchronizing signal in response to the conversion of the first type of moving image contents into the second type of moving image contents.

3. The moving image contents viewing system according to claim 1, wherein one of the first moving image contents and the second moving image contents is a three-dimensional moving image contents and the other is a two-dimensional moving image contents.

4. The moving image contents viewing system according to claim 1 further comprising a tuner configured to receive the first type of moving image contents and the second type of moving image contents, wherein the moving image contents provider is configured to provide the first type of moving image contents and the second type of moving image contents from the tuner.

5. The moving image contents viewing system according to claim 1 further comprising a recorder configured to record the first type of moving image contents and the second type of moving image contents, wherein the moving image contents provider is configured to provide the first type of moving image contents and the second type of moving image contents from the recorder.

6. The moving image contents viewing system according to claim 1, wherein the display is configured to inform on the display whether the first type of moving image contents is displayed or the second type of moving image contents is displayed.

7. The moving image contents viewing system according to claim 1,
    wherein the moving image contents provider is configured to convert the first type of moving image contents into the second type of moving image contents for display.

8. The moving image contents viewing system according to claim 7 further comprising a tuner configured to receive the first type of moving image contents and the second type of moving image contents, wherein the moving image contents provider is configured to provide the first type of moving image contents and the second type of moving image contents from the tuner.

9. The moving image contents viewing system according to claim 7 further comprising a recorder configured to record the first type of moving image contents and the second type of moving image contents, wherein the moving image contents provider is configured to provide the first type of moving image contents and the second type of moving image contents from the recorder.

10. The moving image contents viewing system according to claim 7, wherein the display is configured to inform on the display whether the first type of moving image contents is displayed or the second type of moving image contents is displayed.

11. A moving image contents viewing system capable of viewing a first type of moving image contents and a second type of moving image contents, comprising:
- a moving image contents provider configured to provide the first type of moving image contents and the second type of moving image contents;
- a display configured to display the first type of moving image contents and the second type of moving image contents from the image content provider;
- a generator of a synchronizing signal related to the display of the first type of the moving image contents; and
- a controller configured to have the generator transmit the synchronizing signal when the first type of moving image contents is displayed on the display and to have the generator halt the transmission of the synchronizing signal when the second type of moving image contents is displayed on the display,
- wherein one of the first moving image contents and the second moving image contents is a main body of a moving image program and the other is a commercial message.

12. The moving image contents viewing system according to claim 11, wherein the moving image contents provider is configured to convert the first type of moving image contents into the second type of moving image contents for display, and wherein the controller is configured to halt the transmission of the synchronizing signal in response to the conversion of the first type of moving image contents into the second type of moving image contents.

13. The moving image contents viewing system according to claim 11, wherein one of the first moving image contents and the second moving image contents is a three-dimensional moving image contents and the other is a two-dimensional moving image contents.

14. The moving image contents viewing system according to claim 11 further comprising a tuner configured to receive the first type of moving image contents and the second type of moving image contents, wherein the moving image contents provider is configured to provide the first type of moving image contents and the second type of moving image contents from the tuner.

15. The moving image contents viewing system according to claim 11 further comprising a recorder configured to record the first type of moving image contents and the second type of moving image contents, wherein the moving image contents provider is configured to provide the first type of moving image contents and the second type of moving image contents from the recorder.

16. The moving image contents viewing system according to claim 11, wherein the display is configured to inform on the display whether the first type of moving image contents is displayed or the second type of moving image contents is displayed.

17. The moving image contents viewing system according to claim 11, wherein the moving image contents provider is configured to convert the first type of moving image contents into the second type of moving image contents for display.

18. The moving image contents viewing system according to claim 17 further comprising a tuner configured to receive the first type of moving image contents and the second type of moving image contents, wherein the moving image contents provider is configured to provide the first type of moving image contents and the second type of moving image contents from the tuner.

19. The moving image contents viewing system according to claim 17 further comprising a recorder configured to record the first type of moving image contents and the second type of moving image contents, wherein the moving image contents provider is configured to provide the first type of moving image contents and the second type of moving image contents from the recorder.

20. The moving image contents viewing system according to claim 17, wherein the display is configured to inform on the display whether the first type of moving image contents is displayed or the second type of moving image contents is displayed.

* * * * *